(12) United States Patent
Dolgunov et al.

(10) Patent No.: US 8,782,389 B2
(45) Date of Patent: Jul. 15, 2014

(54) STORAGE DEVICE AND METHOD FOR UPDATING A SHADOW MASTER BOOT RECORD

(75) Inventors: Boris Dolgunov, Ramat-Gen (IL); Roman Rozental, Netania (IL)

(73) Assignee: SanDisk Technologies Inc., Plano, TX (US)

( * ) Notice: Subject to any disclaimer, the term of this patent is extended or adjusted under 35 U.S.C. 154(b) by 586 days.

(21) Appl. No.: 13/204,387

(22) Filed: Aug. 5, 2011

(65) Prior Publication Data

US 2013/0024682 A1   Jan. 24, 2013

Related U.S. Application Data (60) Provisional application No. 61/509,406, filed on Jul. 19, 2011.

(51) Int. Cl.
*G06F 1/24* (2006.01)
*G06F 9/44* (2006.01)
*G06F 21/80* (2013.01)

(52) U.S. Cl.
CPC .............. *G06F 9/4401* (2013.01); *G06F 21/80* (2013.01)
USPC .................................. 713/100; 713/1; 713/2

(58) Field of Classification Search
CPC .................................................... G06F 9/4411
USPC .................................................. 713/100, 1, 2
See application file for complete search history.

(56) References Cited

U.S. PATENT DOCUMENTS

| | | |
|---|---|---|
| 5,379,431 A | 1/1995 | Lemon et al. |
| 5,701,477 A | 12/1997 | Chejlava, Jr. |
| 5,870,520 A | 2/1999 | Lee et al. |
| 6,185,678 B1 | 2/2001 | Arbaugh et al. |
| 6,425,079 B1 | 7/2002 | Mahmoud |
| 6,625,729 B1 | 9/2003 | Angelo et al. |
| 7,017,038 B1 | 3/2006 | LaChance et al. |

(Continued)

FOREIGN PATENT DOCUMENTS

WO    WO 00/21238    4/2000

OTHER PUBLICATIONS

Office Action for U.S. Appl. No. 12/853,924, dated Mar. 4, 2013, 18 pages.

(Continued)

*Primary Examiner* — Kim Huynh
*Assistant Examiner* — Austin Hicks
(74) *Attorney, Agent, or Firm* — Brinks Gilson & Lione (57) ABSTRACT

A storage device and method for updating a shadow master boot record (MBR) are provided. In one embodiment, a storage device is provided having a memory with a first storage area and a second storage area. The storage device receives updated sectors of the shadow MBR from a host device and writes the updated sectors in the second storage area. The storage device determines a highest written sector in the first storage area that is occupied by the shadow MBR. The storage device copies the non-updated sectors of the shadow MBR from the first storage area to the second storage area, wherein only the non-updated sectors up to the highest written sector are copied. Accordingly, any non-updated sectors above the highest written sector are not copied from the first storage area to the second storage area. The storage device then designates the second storage area as storing a current version of the shadow MBR.

26 Claims, 10 Drawing Sheets

(56) References Cited

U.S. PATENT DOCUMENTS

| | | | |
|---|---|---|---|
| 7,251,725 | B2 | 7/2007 | Loison et al. |
| 7,266,849 | B1 | 9/2007 | Gregory et al. |
| 7,634,648 | B2 | 12/2009 | Koyama et al. |
| 8,032,181 | B2 | 10/2011 | Hauck et al. |
| 8,122,234 | B1 * | 2/2012 | Orr .................................. 713/2 |
| 2003/0009657 | A1 | 1/2003 | French et al. |
| 2003/0018892 | A1 | 1/2003 | Tello |
| 2004/0003288 | A1 | 1/2004 | Wiseman et al. |
| 2005/0138423 | A1 | 6/2005 | Ranganathan |
| 2006/0015717 | A1 | 1/2006 | Liu et al. |
| 2006/0026415 | A1 * | 2/2006 | Chen .................................. 713/2 |
| 2006/0064752 | A1 | 3/2006 | Wang et al. |
| 2006/0155837 | A1 | 7/2006 | Kobayashi et al. |
| 2006/0184794 | A1 | 8/2006 | Desselle et al. |
| 2007/0061561 | A1 | 3/2007 | Hashiguchi |
| 2007/0067617 | A1 | 3/2007 | Tarkkala |
| 2007/0192610 | A1 | 8/2007 | Chun et al. |
| 2007/0235517 | A1 | 10/2007 | O'Connor et al. |
| 2008/0077592 | A1 | 3/2008 | Brodie et al. |
| 2008/0162917 | A1 | 7/2008 | McAvoy |
| 2009/0112823 | A1 | 4/2009 | Aharonov et al. |
| 2009/0172252 | A1 * | 7/2009 | Tomlin et al. ................. 711/103 |
| 2009/0193507 | A1 | 7/2009 | Ibrahim |
| 2009/0204964 | A1 | 8/2009 | Foley et al. |
| 2009/0282232 | A1 | 11/2009 | Ugokwe |
| 2009/0300415 | A1 | 12/2009 | Zhang et al. |
| 2010/0011200 | A1 | 1/2010 | Rosenan |
| 2010/0011350 | A1 | 1/2010 | Zayas |
| 2010/0023743 | A1 | 1/2010 | Sastry et al. |
| 2010/0070749 | A1 | 3/2010 | Tsai |
| 2010/0306399 | A1 | 12/2010 | Khosravi et al. |
| 2010/0332855 | A1 * | 12/2010 | Dolgunov et al. ............. 713/194 |
| 2011/0131447 | A1 | 6/2011 | Prakash et al. |

OTHER PUBLICATIONS

Office Action for U.S. Appl. No. 12/853,924, dated Aug. 28, 2012, 17 pages.

Office Action for U.S. Appl. No. 12/853,924 dated Aug. 6, 2013, 19 pages.

"TCG Storage Application Note: Encrypting Drives Compliant with Opal SSC", Specification Version 1.00, Final Revision 1.00, Feb. 19, 2010, pp. ii-92.

U.S. Appl. No. 12/853,924 entitled, "Host Device and Method for Securely Booting the Host Device with Operating System Code Loaded From a Storage Device", filed Aug. 10, 2010, 32 pages.

Micron Technical Note: Booting from Embedded MMC, TN-29-18, 16 pages, 2006.

SanDisk iNAND™ eSD/eMMC Embedded Flash Drive, 2 pages, 2008.

Trusted Boot: Verifying the Xen Launch, Joseph Cihula, Intel Corp., Fall 2007 Xen Summit, 12 pages, 2007.

CE Linux Forum, Trusted Boot Loader, Steve Johnson, 37 pages, Apr. 12, 2006.

International Search Report and Written Opinion for PCT/IB2011/001748, dated Nov. 29, 2011, 9 pages.

JEDEC Standard, Mar. 2009, pp. 33-40, retrieved from http://www.jedec.org/sites/default/files/docs/JESD84-A44_0.pdf, retrieved on Nov. 9, 2011.

* cited by examiner

STORAGE DEVICE AND METHOD FOR UPDATING A SHADOW MASTER BOOT RECORD

CROSS-REFERENCE TO RELATED APPLICATION

This application claims the benefit of U.S. Provisional Application No. 61/509,406, filed Jul. 19, 2011, which is hereby incorporated by reference.

BACKGROUND

In some environments, a host device (such as a mobile phone or other device) is used with an embedded or removable storage device (such as a hard drive, a solid state drive, Secure Digital (SD) card, or a MultiMedia Card (MMC)). Some storage devices store a master boot record (MBR) at logical block address (LBA) 0 and store operating system code elsewhere in the storage device. When the host device is first powered up, a small amount of firmware on the host device enables it to read the MBR from LBA 0. The MBR contains computer-readable program code that, when executed by the host device, provides the host device with the ability to read the other parts of the operating system code from the storage device and boot up the host device.

To protect the operating system from being tampered with (e.g., to prevent the introduction of viruses) and to prevent access to important private information if the storage device is lost, the operating system code (including the MBR) can be encrypted, so that the MBR and operating system code are accessible only to authorized users. (In addition to using encryption, the storage device may be configured to restrict access to the protected areas when the protected areas include the operative system code.) As the host device will not be able to read the MBR prior to authenticating to the storage device, the storage device can store a "shadow master boot record (MBR)" that contains computer-readable program code that, when executed by the host device, collects authentication information (e.g., collects a password from the user) and sends the collected authentication information to an authentication program running on the storage device. Because the small amount of firmware on the host device enables the host device to only read LBA 0 prior to fully booting up, the storage device temporarily maps LBA 0 to the shadow MBR. That way, when the host device reads LBA 0, it receives the shadow MBR instead of the actual MBR. After successful authentication, the storage device remaps LBA 0 to the original MBR, so that the host device can receive the actual MBR and boot up as described above.

Over time, the shadow MBR may need to be updated. The shadow MBR is typically implemented as read-only for security reason and can be updated after authentication through special read/write commands. The Trusted Computing Group (TCG) set forth a standard for updating the shadow MBR. While the TCG standard contains general requirements for the update process, such as the requirement that the update be done in an atomic manner and that a certain amount of memory be allocated for the shadow MBR, the standard does not provide specific implementations of the standard that can be used to efficiently update the shadow MBR.

Overview

Embodiments of the present invention are defined by the claims, and nothing in this section should be taken as a limitation on those claims.

By way of introduction, the below embodiments relate to a storage device and method for updating a shadow master boot record (MBR) stored in the storage device. In one embodiment, a storage device is provided having a memory with a first storage area and a second storage area. The storage device receives updated sectors of the shadow MBR from a host device and writes the updated sectors in the second storage area. The storage device determines a highest written sector in the first storage area that is occupied by the shadow MBR. The storage device copies the non-updated sectors of the shadow MBR from the first storage area to the second storage area, wherein only the non-updated sectors up to the highest written sector are copied. Accordingly, any non-updated sectors above the highest written sector are not copied from the first storage area to the second storage area. The storage device then designates the second storage area as storing a current version of the shadow MBR.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

In general, the below embodiments relate to a storage device and method for updating a shadow master root record (MBR) stored in the storage device. As will be discussed in detail below, the Trusted Computing Group (TCG) has promulgated a standard for updating a shadow MBR. While the TCG standard contains general requirements for the update process, such as the requirement that the update be done in an atomic manner and that 128 MB be allocated for the shadow MBR, the standard does not provide specific implementations. The following embodiments provide specific implementations of the standard that can be used to efficiently update the shadow MBR. For example, in one embodiment, a storage device has a first storage area for storing the active shadow MBR (before update) and a second storage area for storing an updated shadow MBR. During the update process, the storage device receives updated sectors from a host device and stores those updated sectors in the second storage area. To complete the updated shadow MBR copy-building process, the storage device copies the non-updated sectors from the first storage area to the second storage area. These embodiments recognize the fact that a shadow MBR typically occupies far less than the 128 MB of allocated space required by the TCG standard. Accordingly, instead of copying all of the non-updated sectors from the first storage area to the second storage area, the storage device of these embodiments determines a highest written sector in the first storage area and then copies only the non-updated sectors up to the highest written sector. By dealing only with the relevant sectors in the copying process, these embodiments avoid needless delay and possible timeout problems that can occur in copying irrelevant sectors.

Before turning to these and other embodiments, the following section describes exemplary host and storage devices.

Exemplary Host and Storage Devices

Figure 1:
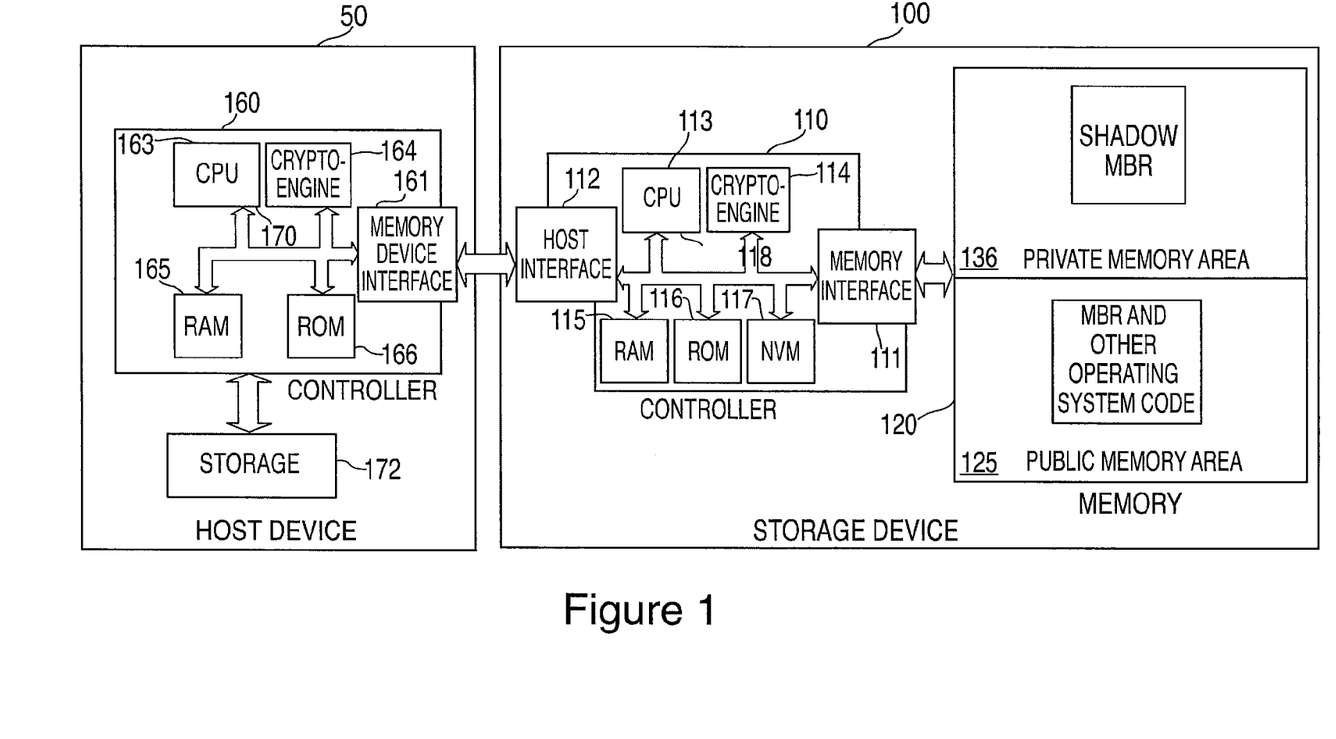
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. For example, the host device 50 and storage device 100 can each have mating physical connectors that allow the storage device 100 to be removably connected to the host device 50. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof. In this embodiment, the storage device 100 is a mass storage device that can take any suitable form, such as, but not limited to, an embedded memory (e.g., a secure module embedded in the host device 50) and a handheld, removable memory card, as well as a universal serial bus (USB) device and a removable or non-removable hard drive (e.g., magnetic disk or solid-state or hybrid drive). In one embodiment, the storage device 100 takes the form of an iNAND™ eSD/eMMC embedded flash drive by SanDisk Corporation.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 113, a hardware crypto-engine 114 operative to provide encryption and/or decryption operations, read access memory (RAM) 115, read only memory (ROM) 116 which can store firmware for the basic operations of the storage device 100, and a non-volatile memory (NVM) 117 which can store a device-specific key used for encryption/decryption operations. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. In this embodiment, the memory 120 comprises a public memory area 125 that is managed by a file system on the host 50 and a private memory area 136 that is internally managed by the controller 110. The private memory area 136 can store a shadow master boot record (MBR) (as will be described below), as well as other data, including, but not limited to, content encryption keys (CEKs) and firmware (FW) code. However, access to the various elements in the private memory area 136 can vary. For example, the shadow MBR may be accessible by the host device 50 for some time period, whereas the CEKs and other internal assets may never be accessible by the host device 50. Also, the shadow MBR may include small operating system by itself like the main user area. (In this embodiment, the shadow MBR is stored in the private memory area 136 of the storage device 100 to prevent a shadow MBR from tampering; however the shadow MBR does not necessarily need to be stored there.) The public memory area 125 can store a master boot record (MBR) and other operating system code for the host device 50 (as will be described below), as well as user data and other data. The public memory area 125 and the private memory area 136 can be different partitions of the same memory unit or can be different memory units. The private memory area 136 is "private" (or "hidden") because it is internally managed by the controller 110 (and not by the host's controller 160).

Turning now to the host 50, the host 50 comprises a controller 160 that has a storage device interface 161 for interfacing with the storage device 100. The controller 160 also comprises a central processing unit (CPU) 163, an optional crypto-engine 164 operative to provide encryption and/or decryption operations, read access memory (RAM) 165, read only memory (ROM) 166, a security module 171, and storage 172. The storage device 100 and the host 150 communicate with each other via a storage device interface 161 and a host interface 112. For operations that involve the secure transfer of data, it is preferred that the crypto-engines 114, 164 in the storage device 100 and host 150 be used to mutually authenticate each other and provide a key exchange. After mutual authentication is complete, it is preferred that a session key be used to establish a secure channel for communication between the storage device 150 and host 100. Alternatively, crypto-functionality may not be present on the host side, where authentication is done only using a password. In this case, the user types his password into the host device 50, and the host device 50 sends it to the storage device 100, which allow access to the public memory area 125. The host 50 can contain other components (e.g., a display device, a speaker, a headphone jack, a video output connection, etc.), which are not shown in FIG. 1 to simplify the drawings.

Overview of the Booting Process of the Host Device

In general, the host device's CPU 163 can only execute program code found in the host device's ROM 166 or RAM 165. When the host device 50 is first powered up, it does not have an operating system in ROM 166 or RAM 165. (When the host device 50 is a PC, the PC can have a BIOS non-volatile memory instead of a ROM.) However, the host device 50 does have a small program stored in ROM 166, which the CPU 163 can execute to send an instruction to the storage device 100 to initiate the boot mode. As part of this process, the storage device 100 would send back the data that is stored in LBA 0. Typically, this is the master boot record (MBR), which contains computer-readable program code that, when executed by the host device 50, provides the host device 50 with the ability to read the other parts of the operating system code from the storage device 100 and boot up the host device 50. (The can be considered as part of the operating system code, as it includes information about how the BIOS should continue with the operating system boot.) However, as mentioned above, in environments in which the MBR and operating system code are encrypted to prevent tampering, the host device 50 is unable to read the MBR and boot up before being authenticated by the storage device 100. In this situation, the mechanism illustrated in FIG. 2 can be used.

Figure 2:
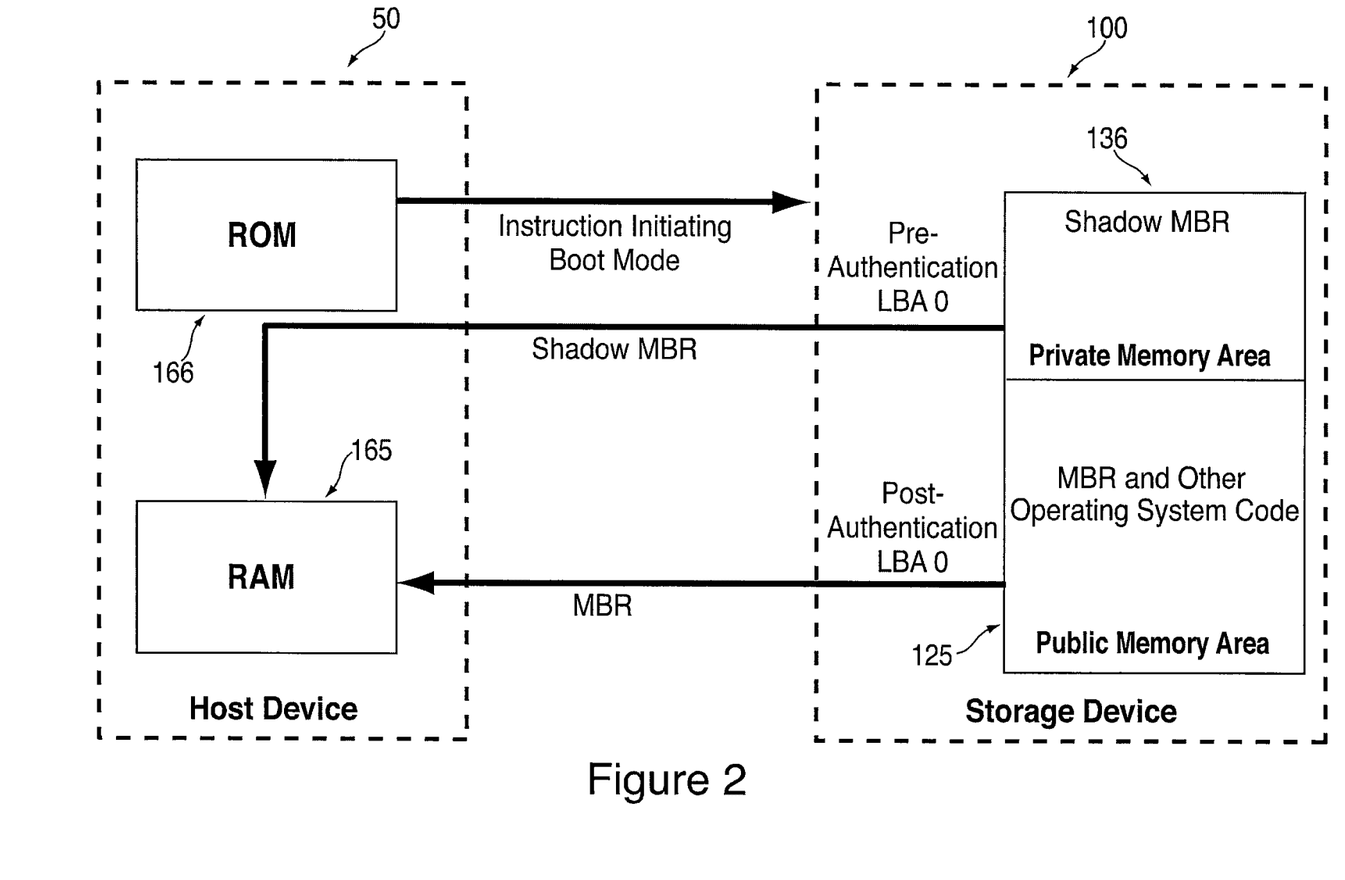
FIG. 2 is a block diagram of a host device and storage device that diagrammatically illustrates a boot process of an embodiment.

As shown in FIG. 2, before the host device 50 is authenticated to the storage device 100, the storage device maps LBA 0 to a shadow MBR instead of the actual MBR. Because of this mapping, when the storage device 100 receives the instruction from the host device 50 to initiate a boot mode, the storage device 100 provides the host device 50 with the shadow MBR and not the actual MBR. The shadow MBR contains computer-readable program code that, when executed by the host device 50, collects authentication information and sends the collected authentication information to an authentication program running on the storage device's controller 110. The shadow MBR can collect the authentication information in any suitable way. For example, a password from a user can obtained and sent to the storage device 100 for authentication. As another example, a code from hardware parameters (e.g., a unique hardware identifier, a memory size, a Media Access Control (MAC) address, or a controller version) in the host device 50 can be obtained and sent to the storage device 100 for authentication. As yet another example, a code (e.g., an International Mobile Subscriber Identity (IMSI) identifier or an International Mobile Equipment Identity (IMEI) identifier) from a Subscriber Identity Module (SIM) card in the host device 50 can obtained and sent to the storage device 100 for authentication.

No matter what form of authentication is used, after the host device 50 successfully authenticates to the storage device 100, the storage device 100 remaps LBA 0 to the actual MBR. Because of this remapping, when the host device 50 resets and sends an instruction to read LBA 0, the storage device 100 returns the actual MBR (not the shadow MBR) to the host device 50. With the actual MBR, the host device 50 is able to read the other operating system code from the storage device 100 and boot up.

Updating the Shadow Master Boot Record

As mentioned above, over time, the shadow MBR may need to be updated, and the Trusted Computing Group (TCG) has defined a standard for updating a shadow MBR. While the TCG standard contains general requirements for the update process, the standard does not provide specific implementations. The following paragraphs first describe some of the general requirements of the standard and then set forth specific implementations that can be used to efficiently update the shadow MBR.

Figure 3:
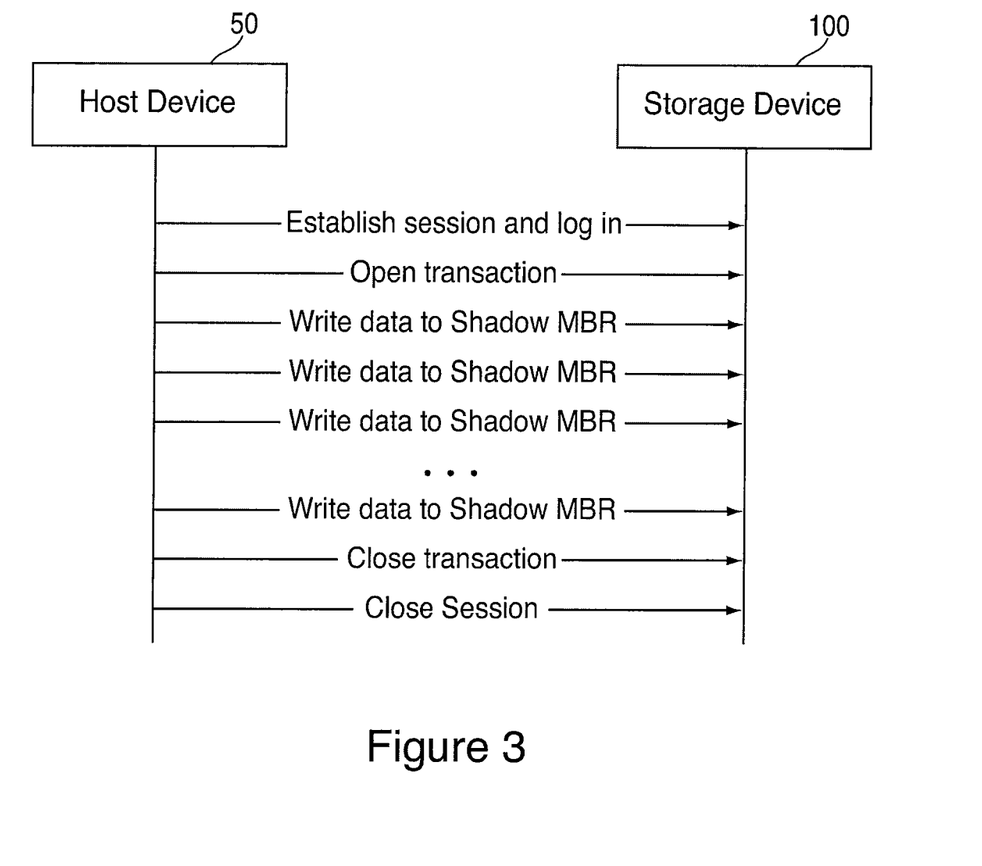
FIG. 3 is a flow diagram of an atomic transaction process for updating a shadow MBR of an embodiment.

One of the requirements of the TCG standard is that the updated shadow MBR be written to the storage device 100 in as an atomic transaction. The TCG standard also specifies that special commands (as opposed to standard user data write command) be used to update the shadow MBR. FIG. 3 illustrates the process of updating a shadow MBR using an atomic transaction. First, the host device 50 establishes a session with the storage device 100 and logs in. The host device 50 then opens the transaction and performs several write operations to write updated shadow MBR data to the storage device 100. When the last write operation is completed, the host device 50 closes the transaction and the closes the session. By being a "transaction," each of the write operations are tied together in the sense that if the transaction fails to close (e.g., because of a relevant host request or because of the failure of any one of the write operations or because of a power loss before the close transaction command is performed), none of the data written in the transaction will be deemed valid. Accordingly, if the close transaction command is not performed for whatever reason, the storage device 100 will continue to use the current version of the shadow MBR and will delete the portions of the updated shadow MBR that were written in the aborted update attempt. However, if the close command is performed, the updated shadow MBR was successfully written and can be used.

Another requirement of the TCG standard is that the storage device 100 support up to a 128 MB storage area for the shadow MBR. Accordingly, a first storage area containing the active shadow MBR and a second storage area available for receiving an updated shadow MBR are each 128 MB areas. In one possible implementation of the standard, if the update transaction is successful, the 128 MB in the second storage area is written above the 128 MB of data of the original shadow MBR in the first storage area. Likewise, if the update transaction is unsuccessful, the 128 MB of data in first storage area is written above the 128 MB of data of the unsuccessful updated shadow MBR in the second storage area. However, this technique of writing one copy above the other requires that the storage device 100 read and write 128 MB of data (the minimum specified by the TCG standard) when the transaction is closed. This technique may take a relatively long time since all 128 MB of data need to be read and written, which can result in a command execution timeout. In addition, during the period of time that one copy is written over the other, the storage device 100 may be unable to begin a new update transaction or perform other actions.

Figure 4:
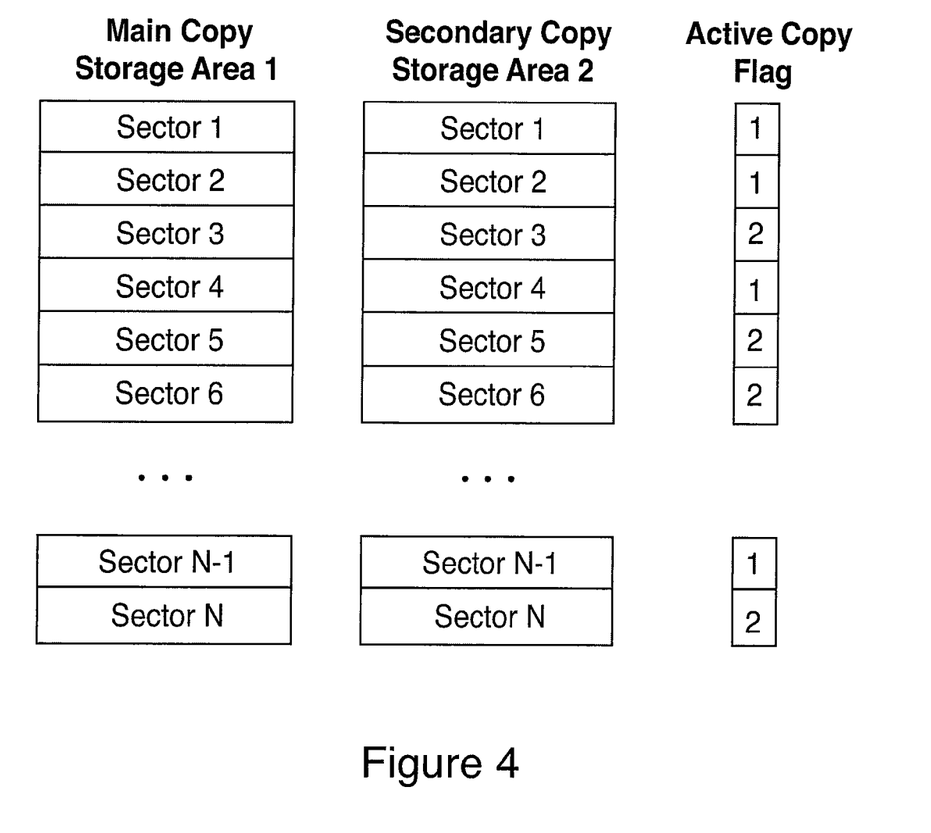
FIG. 4 is an illustration of a technique for updating a shadow MBR of an embodiment.

Another possible implementation of the standard that can be used to avoid copying all 128 MB of data (and, thereby, avoid the resulting command execution timeout) is shown in FIG. 4. This implementation may be useful where some, but not all, of the sectors of the shadow MBR are being updated, as it avoids copying the common (non-updated) sectors in the shadow MBR. As shown in FIG. 4, the 128 MB of space required by the TCG standard is made up of N sectors. (As used herein, the term "sector" broadly refers to a logical area of memory and can be of any suitable fixed or variable size.) A first storage area stores the current version of the shadow MBR (designated as the Main Copy in FIG. 4), and the second storage area is available to store the updated version of the shadow MBR (designated as the Secondary Copy in FIG. 2). In this implementation, if only some of the sectors need to be updated with new data, the storage device 100 stores only those updated sectors in the second storage area. For example, in the example shown in FIG. 4, only sectors 3, 5, 6, and N contain updated sectors, so only those sectors (and none of the others) are written in the second storage area. Since the other sectors of the updated shadow MBR are already stored in the first storage area, this implementation does not re-write those sectors. Instead, a flag (or some other technique) for each sector is used to designate whether the sector in the first storage area or the sector in the second storage area contains data for the active shadow MBR. Accordingly, in the example shown in FIG. 4, the "active copy flag" is set to the second storage area for sectors 3, 5, 6, and N and is set to the first storage area for the other sectors. During the next update transaction, if the relevant shadow MBR sector is kept in the first copy, the updated sector version is written to the second copy and vice versa with the corresponding flags updated. When the storage device 100 needs to read the shadow MBR, for each sector, the storage device 100 would read the active copy flag to determine whether to read out a sector in the first storage area or the second storage area. Since this implementation results in the use of two storage areas (instead of a single storage area, as in the previously-described implementation), this implementation avoids the need of copying 128 MB of data from one storage area to another. Accordingly, this implementation avoids the timeout problem mentioned above. However, because two storage areas are used, in some implementations, the process of streaming out the shadow MBR may not be as efficient as when the shadow MBR is held in a single storage area.

Figure 5:
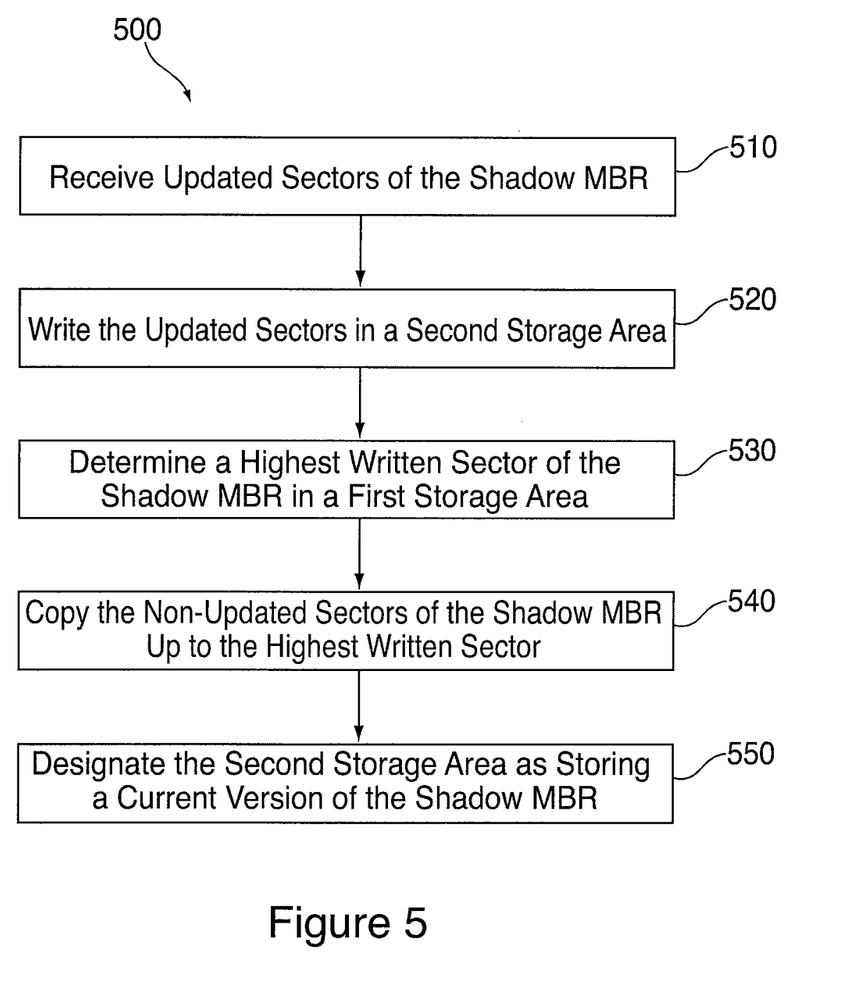
FIG. 5 is a flow chart of a method of an embodiment for updating a shadow master root record stored in the storage device.

As can be seen from the above examples, using the technique of copying all of the sectors from one storage area to the other can create a timeout problem, whereas the technique of using two memory areas ("split tables"), while avoiding the copying/timeout problems, can result in an inefficient reading out of the shadow MBR. The following embodiment presents a "best of both worlds" situation by avoiding the timeout problem without incurring the read penalty of the "split tables" technique. Specifically, this embodiment recognizes that a shadow MBR typically occupies far less than the 128 MB of allocated space required by the TCG standard. In fact, many shadow MBRs are less than 1 MB. This embodiment will be discussed in conjunction with the flow chart 500 of FIG. 5 and the examples shown in FIGS. 6-9.

As shown in FIGS. 6-9 and as discussed above, in this embodiment, the storage device 100 has a first storage area (Storage Area 1) and a second storage area (Storage Area 2). At this point in time, the first storage area stores the active shadow MBR (the "Main Copy"), and the second storage area is available to store the updated shadow MBR (the "Secondary Copy"). The first and second storage areas can be located in the private memory area 136 to prevent tampering. Also, if the storage device 100 is in compliance with the TCG standard, writes to the first and second storage areas are made using special commands specified in the TCG standard, as opposed to standard user data write commands. Further, this example assumes that, during the update transaction, the host device 50 will be updating the shadow MBR by sending updated sectors in increasing offset order (e.g., sector 1, then sector 2, then sector 5, then sector 7, etc.).

Figure 6:
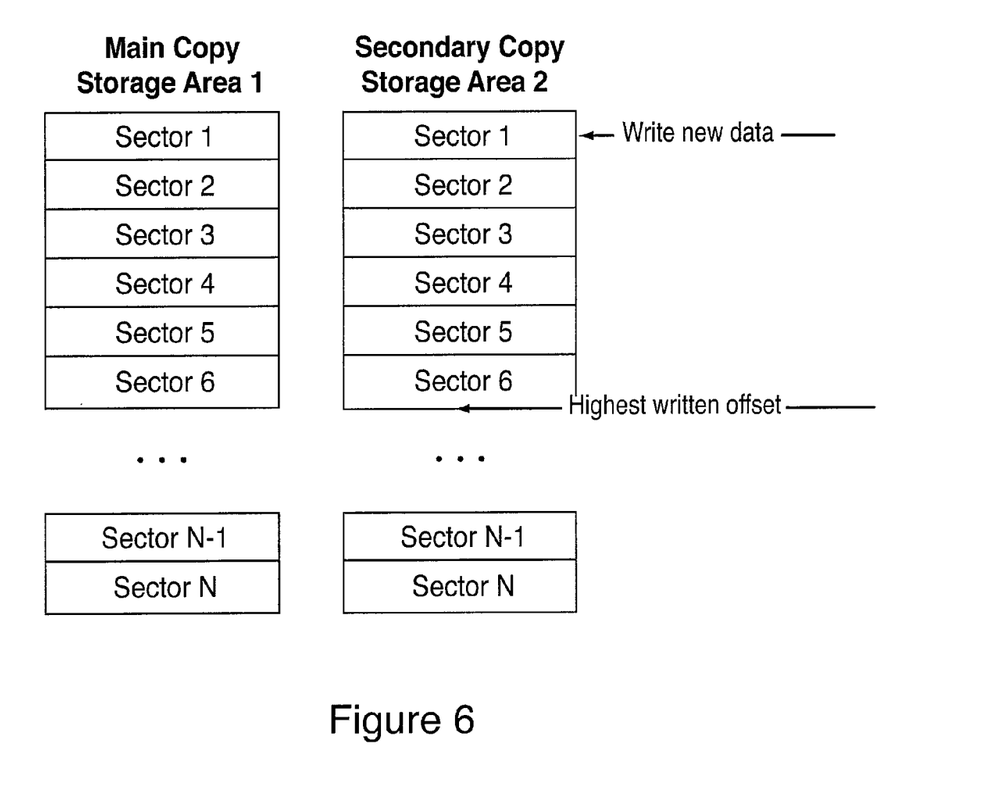
FIG. 6 is an illustration of a technique for updating a shadow MBR of an embodiment.
Figure 7:
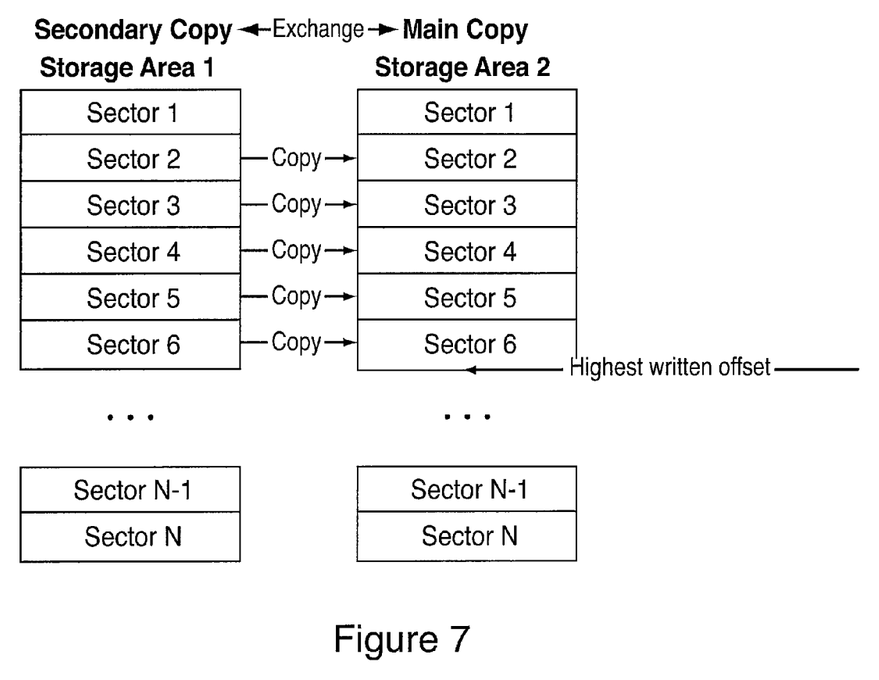
FIG. 7 is an illustration of a technique for updating a shadow MBR of an embodiment.
Figure 8:
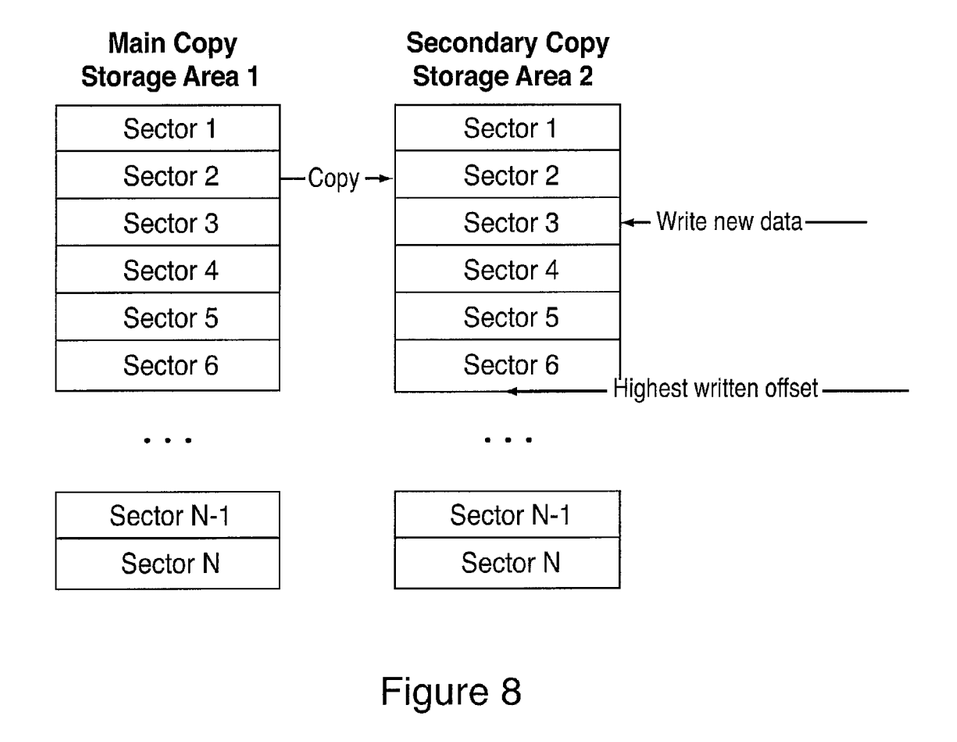
FIG. 8 is an illustration of a technique for updating a shadow MBR of an embodiment.
Figure 9:
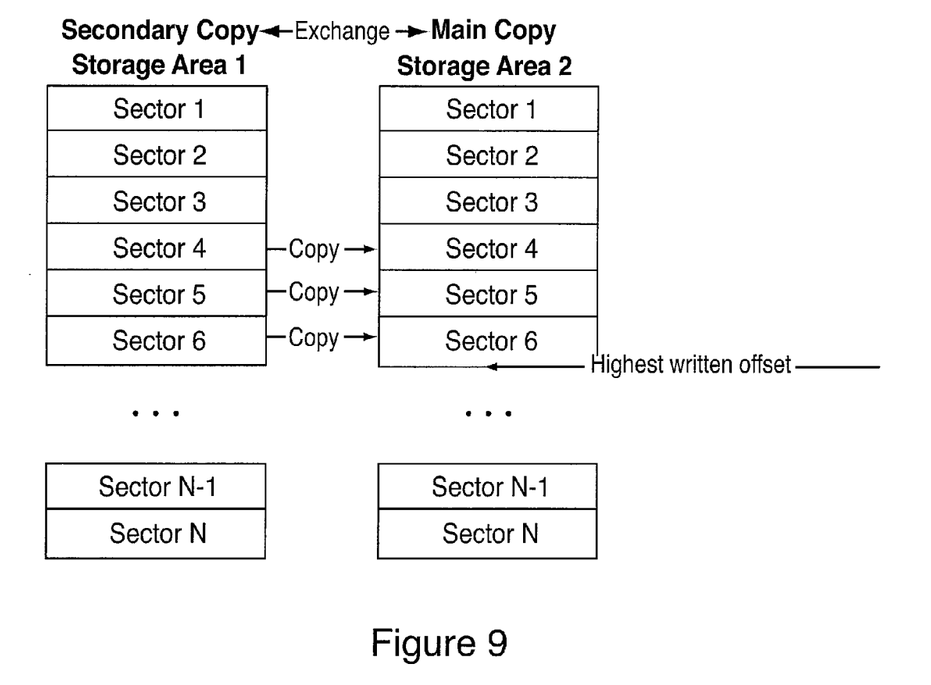
FIG. 9 is an illustration of a technique for updating a shadow MBR of an embodiment.

In the example shown in FIG. 6-7, the updated shadow MBR consists of an update to a single sector (sector 1), and the remaining sectors are the same as the active shadow MBR. With reference to the flow chart 500 shown in FIG. 5, the storage device 100 first receives an updated sector (here sector 1) from the host device 50 (act 510) and then writes updated sector 1 in the second storage area (act 520). As sector 1 is the only updated sector in this example, the remaining sectors in the updated shadow MBR would be identical to the non-updated sectors in the active shadow MBR. Accordingly, the remaining non-updated sectors (sector 2 to sector N) from the first storage area can be copied over to the second storage area. However, as noted above, copying all non-updated sectors from the first storage area can take a relatively long time and may cause a timeout. Further, copying all non-updated sectors may not even be necessary if the shadow MBR does not occupy all sectors.

Because of this, in this embodiment, the storage device 100 determines a highest written sector in the first storage area that is occupied by the shadow MBR (act 530). This is denoted as the "highest written offset" in FIG. 6, with "offset" referring to the fact that the sector numbers shown in the drawings may not be absolute numbers, but rather offsets from some baseline number. The storage device 100 can determine the highest written sector in any suitable manner. For example, the storage device 100 can keep the "highest written offset" value in non-volatile memory, set it to 0 upon creating the shadow MBR area, and check if it should be modified upon each "writeMBR" command. Alternatively, the storage device 100 can scan the sectors in the first storage area to see which sectors are signed as unwritten. In that case, the highest written sector would be the sector prior to the first unwritten sector. As another example, the host device 50 can inform the storage device 100 of the highest written sector when it writes the shadow MBR in the storage device 100. Of course, these are only example, and other techniques for determining the highest written sector can be used.

By knowing the highest written sector of the active shadow MBR in the first storage area, the storage device 100 is able to copy only those non-updated sectors up to the highest written sector (act 540). In this example, the storage device 100 would copy non-updated sectors 2-6 from the first storage area to the second storage area, as illustrated in FIG. 7. (As seen from this and the other example, when copying the non-updated sectors to the second storage area, the order of the non-updated sectors in the second storage area is the same as the order of the non-updated sectors in the first storage area.) Since sectors 7 to N do not contain shadow MBR data, they are not copied over, thereby eliminating a needless, time-consuming copying process that can cause a timeout. When the transaction is deemed successful, the storage device 100 designates the second storage area as storing the active version of the shadow MBR (act 560). This is illustrated by the "exchange" notation in FIG. 7, where the updated shadow MBR in the second storage area is designated as the "Main Copy," and the first storage area is designated as the "Secondary Copy" and made available to future updates to the shadow MBR.

There are several advantages associated with this embodiment. For example, because this embodiment only copies those non-updated sectors from the first storage area that are actually occupied with data (instead of copying the entire 128 MB of sectors), this embodiment avoids the needless copying of sectors that can result in a timeout. Also, because the use of this embodiment results in the updated shadow MBR being located in a single memory area (instead of being disbursed between two memory areas), this embodiment avoids the reading inefficiencies that can be encountered in the "split tables" implementation discussed above.

In the example shown in FIGS. 6 and 7, only a single sector of the shadow MBR was updated. When multiple sectors are updated, the same process is applied. However, it is possible that the host device 50 can provide the storage device 100 with non-consecutive updated sectors (e.g., sectors 1 and 3). In such a situation, the non-updated sectors can be copied from the first storage area to the second storage area to "fill in the gaps" after the non-consecutive updated sectors have been written (e.g., sector 2 can be copied from the first storage area after sectors 1 and 3 have been written). However, for efficiency reasons, it may be preferred to have the storage device 100 operating on a progressive sector-by-sector basis. That is, for each sector starting at sector 1 and going to the highest written sector, the storage device 100 will either write an updated sector in the second storage area or will copy the non-updated sector from the first storage area. This will be illustrated with the following example.

Consider the situation in which sectors 1 and 3 are the updated sectors. First, updated sector 1 is written to the second storage area (see FIG. 6). Sector 2 is a non-updated sector. In this example, instead of skipping non-updated sector 2 and later coming back to it, the storage device 100 copies non-updated sector 2 from the first storage area to the second storage area before writing updated sector 3 in the second storage area (see FIG. 8). That is, the storage device 100 copies the non-updated sector(s) in between writes of the non-consecutive updated sectors. As before, after the last updated sector has been written in the second storage area (here, sector 3), the remaining non-updated sectors from the first storage area are copied into the second storage area (here, sectors 4 to 6), and the sectors in the first storage area that were never written to (here, sectors 7 to N) are "skipped" during the copy process (see FIG. 9). As above, when the transaction is deemed successful, the storage device 100 designates the second storage area as storing the active version of the shadow MBR. This is illustrated by the "exchange" notation in FIG. 9, where the updated shadow MBR in the second storage area is designated as the "Main Copy," and the first storage area is designated as the "Secondary Copy."

The following summarizes the above processes in a formal mathematical notation for the situation where the host device 50 sends a shadow MBR update request for table sectors $b_1$ to $e_1$. If $b_1>0$, the storage device 100 copies sectors 0 to $(b_1-1)$ from the first storage area to the second storage area, and then writes updated sectors b1 to e1 from the request to the second storage area. If the next update request contains updates for table sectors b2 to e2, then the storage device 100 performs the following: if b2>e1+1, the storage device 100 copies sectors e1+1 to (b2-1) from the first storage area to the second storage area, and also writes updated sectors b2 to e2 from the request to the second storage area. Upon a successful transaction close, if the last request contained an update for sectors bn to en, the storage device 100 performs the following: if en<highest written offset>, the storage device 100 copies sectors en+1 to highest written offset from the first storage area to the second storage area; otherwise, the highest written offset is set equal to en. The storage device 100 would then delete the previous active copy of the shadow MBR stored in the first storage area and sign the updated copy in the second storage area as the shadow MBR. In summary, if sector updates are sent from the host device 50 in address increasing order (i.e., b2>e1, b3>e2, etc.), these embodiments allow for a minimal amount of data to be copied from the first storage area to the second storage area to update a shadow MBR. This also helps to avoid situations when many sectors must be copied during a single command, as copying many sectors in one command may exceed timeout limits. If, in addition, the update sectors cover the address space without gaps (full update with b2=e1+1, b3=e2+1, etc.), then no sectors need to be copied from the first storage area to the second storage area.

There are several alternatives that can be used with these embodiments. First, it is possible that the update to the shadow MBR can result in additional sectors being written beyond what was the highest written sector. In this situation where data is written beyond what was the highest written sector, the highest sector value is updated accordingly. That way, the next time the shadow MBR is updated, the highest written sector value would reflect the additional sectors added in the previous update. As another example, because the TCG standard does not place write limitations on how the host device 50 can update the shadow MBR, an entire sector of the shadow MBR can be updated or only a portion of the sector can be updated. For example, byte addressing can be used, so the host device 50 can, for example, write four bytes in the first sector and then three bytes in the last sector. In situations wherein only a portion of a sector is being updated, the storage device 100 can use a read-modify-write process. In this process, the storage device 100 can read the original sector out of the first storage area, modify the relevant part(s) of the sector, and write the modified sector to the second storage area. This process is suitable for situations where the update maintains the highest written offset that was already updated during the current transaction. For offsets higher then this number, the data can be copied to the second storage area in its original form, read from the second storage area, modified, and then written back to the second storage area. When the same sector is written again during transaction, it is overwritten in the secondary copy.

Figure 10:
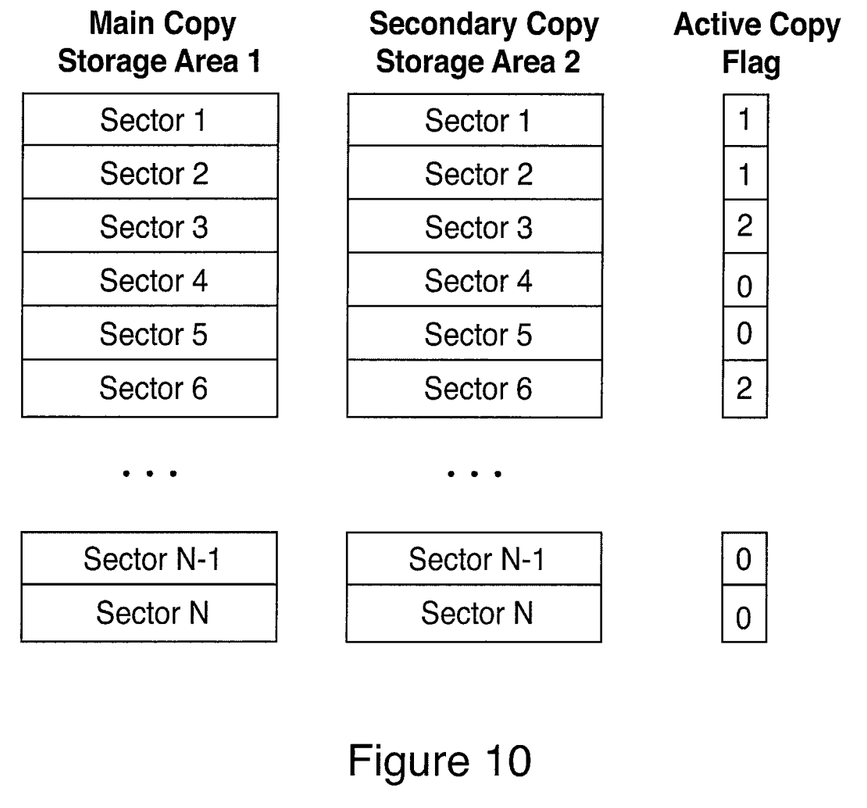
FIG. 10 is an illustration of a technique for updating a shadow MBR of an embodiment.

In the above examples, it was assumed that the non-updated sectors below the highest written sector contained data that needed to be copied over to the second storage area. However, it is possible that some of these non-updated sectors may also be unwritten sectors and, therefore, do not need to be copied over. For example, if the first storage area was written in fragments, there can be "gap" areas that were never written to and, therefore do not need to be copied to the second storage area. In recognition of this possibility, in another alternative, indicators (e.g., a flag, table entries, header information, etc.) are used to indicate whether any given sector is written/unwritten, and only those sectors that are indicated to be written are copied from the first storage area to the second storage area. This concept can be applied to other implementations as well. For example, FIG. 10 is a variation of the "split tables" implementation shown in FIG. 4. In this variation, the active copy flag can store a "1" or a "2" indicating whether the associated sector in table 1 or table 2, respectively, contains valid data. In addition, the active flag can store a "0" indicating that sector in neither table was written to and, therefore, does not need to be read out. Again, the highest written sector can be used here to avoid scanning the flags table until the maximal table size is reached.

Further alternatives can be used. For example, upon a transaction abort, the highest written offset can be set to the value that it had before the transaction. There is no need to copy anything to the second storage area because this embodiment does not assume two valid copies are present at any given time. Additionally, in response to a command from the host device 50 to revert the storage device 100 to a default setting, the storage device 100 can set the highest written sector to 0 and signing all the sectors in the first storage area as unwritten. There is no need to copy or set to zero any data buffers. As yet another alternative, the embodiments discussed above can be used in situations other than updating a shadow MBR. For example, these embodiments can be used with caching algorithms, so that if data received for a table update contains less than one sector, it can be cached in fast memory (e.g., RAM) and then written out using the optimization techniques discussed above. These embodiments can also be used with other large tables defined in the TCG specification, such as the DataStore table, which is used by Windows to store data. Also, instead of or in addition to the master boot record, these embodiments can be used with other data in the boot partition, as well as non-boot-partition data. Also, one embodiment specifies only the "highest written sector" and does not specify when the copy is done and if it is divided to portions. Other embodiment can specify this information. Also, in the situation wherein the shadow MBR data is large enough and much less than 50% of the shadow MBR data is updated during the transaction, it can be preferable not to copy the unchanged data from the first copy to the second one but to copy the updated data from the second copy to the first one.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for updating a shadow master boot record in a storage device, the method comprising:
performing the following in a storage device having a memory with a first storage area having N sectors allocated to it for a shadow master boot record:
receiving updated sectors of the shadow master boot record from a host device;
writing the updated sectors in a second storage area of the memory;
determining a highest written sector (M) in the first storage area that is occupied by the shadow master boot record, wherein M<N;
copying the non-updated sectors of the shadow master boot record from the first storage area to the second storage area, wherein only the non-updated sectors up to the highest written sector (M) are copied; and
designating the second storage area as storing a current version of the shadow master boot record.

2. The method of claim 1, wherein the storage device receives non-consecutive updated sectors from the host device, and wherein the method further comprises copying the non-updated sectors in between writes of the non-consecutive updated sectors.

3. The method of claim 1, wherein the storage device determines the highest written sector (M) in the first storage area by determining which sectors in the first storage area are signed as unwritten.

4. The method of claim 1, wherein each sector is associated with an indicator indicating whether or not the sector was written to, and wherein a non-updated sector from the first storage area is copied to the second storage area only if the indicator associated with that sector indicates that the sector was written to.

5. The method of claim 1, wherein the method further comprises, in response to a command from the host device to revert the storage device to a default setting, setting the highest written sector (M) to 0 and signing all the sectors in the first storage area as unwritten.

6. The method of claim 1, wherein at least one updated sector received from the host device contains an update to some, but not all, of a sector in the first storage area, and wherein the method further comprises:
reading the sector from the first storage area;
modifying a part of the sector; and
writing the modified sector to the second storage area.

7. The method of claim 1, wherein at least one updated sector received from the host device contains an update to some, but not all, of a sector in the first storage area, and wherein the method further comprises:
copying the sector in its original form from the first storage area to the second storage area;
reading the sector from the second storage area;
modifying a part of the sector; and
writing the modified sector back to the second storage area.

8. The method of claim 1, wherein N is 128 MB.

9. The method of claim 1, wherein the first and second storage areas are in a private area of the memory.

10. The method of claim 1, wherein the storage device is embedded in the host device.

11. The method of claim 1, wherein the storage device is removably connectable to the host device.

12. The method of claim 1, wherein the storage device is a solid-state drive.

13. The method of claim 1, wherein the order of the non-updated sectors copied into the second storage area is the same as the order of the non-updated sectors in the first storage area.

14. A storage device comprising:
an interface configured to communicate with a host device;
a memory having a first storage area having N sectors allocated to it for a shadow master boot record and having a second storage area; and
a controller in communication with the interface and the memory, wherein the controller is configured to:
receive updated sectors of the shadow master boot record from the host device;
write the updated sectors in the second storage area;
determine a highest written sector (M) in the first storage area that is occupied by the shadow master boot record, wherein M<N;
copy the non-updated sectors of the shadow master boot record from the first storage area to the second storage area, wherein only the non-updated sectors up to the highest written sector (M) are copied; and
designate the second storage area as storing a current version of the shadow master boot record.

15. The storage device of claim 14, wherein the storage device receives non-consecutive updated sectors from the host device, and wherein the controller is further configured to copy the non-updated sectors in between writes of the non-consecutive updated sectors.

16. The storage device of claim 14, wherein the storage device determines the highest written sector (M) in the first storage area by determining which sectors in the first storage area are signed as unwritten.

17. The storage device of claim 14, wherein each sector is associated with an indicator indicating whether or not the sector was written to, and wherein a non-updated sector from the first storage area is copied to the second storage area only if the indicator associated with that sector indicates that the sector was written to.

18. The storage device of claim 14, wherein the controller is further configured to, in response to a command from the host device to revert the storage device to a default setting, set the highest written sector (M) to 0 and sign all the sectors in the first storage area as unwritten.

19. The storage device of claim 14, wherein at least one updated sector received from the host device contains an update to some, but not all, of a sector in the first storage area, and wherein the controller is further configured to:
read the sector from the first storage area;
modify a part of the sector; and
write the modified sector to the second storage area.

20. The storage device of claim 14, wherein at least one updated sector received from the host device contains an update to some, but not all, of a sector in the first storage area, and wherein the controller is further configured to:
copy the sector in its original form from the first storage area to the second storage area;
read the sector from the second storage area;
modify a part of the sector; and
write the modified sector back to the second storage area.

21. The storage device of claim 14, wherein N is 128 MB.

22. The storage device of claim 14, wherein the first and second storage areas are in a private area of the memory.

23. The storage device of claim 14, wherein the storage device is embedded in the host device.

24. The storage device of claim 14, wherein the storage device is removably connectable to the host device.

25. The storage device of claim 14, wherein the storage device is a solid-state drive.

26. The storage device of claim 14, wherein the order of the non-updated sectors copied into the second storage area is the same as the order of the non-updated sectors in the first storage area.

\* \* \* \* \*